United States Patent
Panchagnula et al.

(10) Patent No.: US 10,291,540 B2
(45) Date of Patent: May 14, 2019

(54) METHOD AND APPARATUS FOR PERFORMING A WEIGHTED QUEUE SCHEDULING USING A SET OF FAIRNESS FACTORS

(71) Applicant: CAVIUM, LLC, San Jose, CA (US)

(72) Inventors: Vamsi Panchagnula, San Jose, CA (US); Heeloo Chung, San Francisco, CA (US)

(73) Assignee: Cavium, LLC, Santa Clara, CA (US)

( * ) Notice: Subject to any disclaimer, the term of this patent is extended or adjusted under 35 U.S.C. 154(b) by 167 days.

(21) Appl. No.: 14/542,298

(22) Filed: Nov. 14, 2014

(65) Prior Publication Data

US 2016/0142333 A1      May 19, 2016

(51) Int. Cl.
*H04L 12/863*         (2013.01)

(52) U.S. Cl.
CPC ........ *H04L 47/6295* (2013.01); *H04L 47/623* (2013.01)

(58) Field of Classification Search
CPC ............... H04L 47/6295; H04L 47/623; H04L 12/5693; H04L 47/2408; H04L 47/20; H04L 47/22
See application file for complete search history.

(56) References Cited

U.S. PATENT DOCUMENTS

| | | | | |
|---|---|---|---|---|
| 6,101,193 | A * | 8/2000 | Ohba | H04L 12/5602 370/395.4 |
| 7,724,760 | B2 | 5/2010 | Balakrishnan et al. | |
| 7,796,627 | B2 | 9/2010 | Hurley et al. | |
| 7,983,299 | B1 * | 7/2011 | Ma | H04L 47/52 370/229 |
| 9,641,465 | B1 | 5/2017 | Gabbay et al. | |
| 2007/0064597 | A1 * | 3/2007 | Bernick | H04L 12/5693 370/229 |
| 2007/0242675 | A1 * | 10/2007 | Romrell | H04L 12/4633 370/395.4 |
| 2011/0255551 | A1 * | 10/2011 | Venables | H04L 12/5693 370/412 |
| 2012/0008636 | A1 * | 1/2012 | Lee | H04L 47/10 370/412 |
| 2014/0286349 | A1 * | 9/2014 | Kitada | H04L 47/6215 370/412 |

* cited by examiner

Primary Examiner — Jeffrey M Rutkowski
Assistant Examiner — Basil Ma

(57) ABSTRACT

A computer-implemented medium using a scheduler for processing requests by receiving packet data from multiple source ports and then classifying, the received packet data based upon the source port received and a destination port the data being sent. Next, sorting, the classified packet data into multiple queues in a buffer, and updating, a static component of one or more of the multiple queues upon the queue receiving the sorted classified data packet. Further, scheduling, using the scheduler based upon the destination port availability and a set of fairness factors including priority weights and positions, for selecting a dequeuing of data packets from a set of corresponding queues of the multiple queues, and then updating the static of the dequeued queue upon the data packet being outputted from the dequeued queue.

31 Claims, 4 Drawing Sheets

METHOD AND APPARATUS FOR PERFORMING A WEIGHTED QUEUE SCHEDULING USING A SET OF FAIRNESS FACTORS

FIELD OF THE INVENTION

Embodiments of the present invention generally relate to improving scheduling of data packets in queues using a set of fairness factors. More specifically, embodiments of the present invention relate to using a weighted round robin scheduling with an additional set of fairness factors for ensuring non-bias queuing of data packets when enabling weighted strict priority switching to output ports.

BACKGROUND OF INVENTION

Queuing and scheduling are functions that are critical to the operation of high speed switching and routings of data packets in switches and routers. Strict priority queueing and weighted round robin WRR are two common scheduling schemes for data switching networks. Generally, in a data switching networking, multiple resources can communicate with a destination address simultaneously. In such cases, during a simultaneous communication, each of the resources is competing with other resources for an available destination at a particular time. There is a variety of scheduling schemes or methodology that can be used in such instances depending on the type of application being used. One such common data packet scheduling resource is strict priority scheduling; this is used in what's commonly known as "a double play" or "triple play environment", that is when there are two or three resources competing resources competing for an available destination. When using a strict priority scheduling scheme, all the incoming data packet requests are classified on a different priority. When a network congestion occurs that is when a link or node is carrying so much data that its quality of service Qos deteriorates causing queuing delay, packet loss or the blocking of new connections. To maintain Qos, the data traffic or data packet requests given the highest priority are transmitted first until the queue of these highest priority data packets is emptied. Next, the data traffic given the next highest priority is selected and so forth.

While such high priority scheduling scheme proves effective in most in many instances, when there are more than one data packet request classified with the same level of high priority, the strict priority scheduling scheme may cause a bias on the scheduling of the selecting of the data packet queues. That is, scheduling when there is multiple equal levels of classifications of priority of these data packet requests, results in a bias of consecutive ordering of the requests received. Hence, equal data packet requests as a result of this bias have the same scheduling as additional factors are not considered other than the classification levels of the data packets in the strict priority scheme.

There is a need for preventing this bias which results from consecutive ordering of requests when multiple requests are given the same priority so that in a weighted strict priority round robin scheme, the same request due to its ordering is in each round of the round robin check selected and not until the initial request has been completed is the next request selected or prioritized.

SUMMARY

A computer-implemented medium using a scheduler for processing requests. The method including receiving packet data from multiple source ports and classifying, the received packet data based upon the source port received and a destination port the data being sent. Then, sorting, the classified packet data into multiple queues in a buffer, and updating, a static component of one or more of the multiple queues upon the queue receiving the sorted classified data packet. Next, scheduling, using the scheduler based upon the destination port availability and a set of fairness factors including priority weights and positions, for selecting a dequeuing of data packets from a set of corresponding queues of the multiple queues, and finally, updating the static of the dequeued queue upon the data packet being outputted from the dequeued queue.

A computer program product tangibly embodied in a computer-readable storage device and comprising instructions that when executed by a processor perform a method for using a scheduler for processing requests. The method including the receiving of packet data from multiple source ports, and classifying, the received packet data based upon the source port received and a destination port the data being sent. Then, sorting, the classified packet data into multiple queues in a buffer, and updating, a static component of one or more of the multiple queues upon the queue receiving the sorted classified data packet. Next, scheduling, using the scheduler based upon the destination port availability and a set of fairness factors including priority weights and positions, for selecting a dequeuing of data packets from a set of corresponding queues of the multiple queues, and updating the static of the dequeued queue upon the data packet being outputted from the dequeued queue.

A system comprising: at least one processor; and at least one computer-readable storage device comprising instructions that when executed cause performance of a method for using a scheduler for processing requests. The method including receiving packet data from multiple source ports, and then classifying, the received packet data based upon the source port received and a destination port the data being sent. Next, sorting, the classified packet data into multiple queues in a buffer, updating, a static component of one or more of the multiple queues upon the queue receiving the sorted classified data packet. Further, scheduling, using the scheduler based upon the destination port availability and a set of fairness factors including priority weights and positions, for selecting a dequeuing of data packets from a set of corresponding queues of the multiple queues, and updating the static of the dequeued queue upon the data packet being outputted from the dequeued queue.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
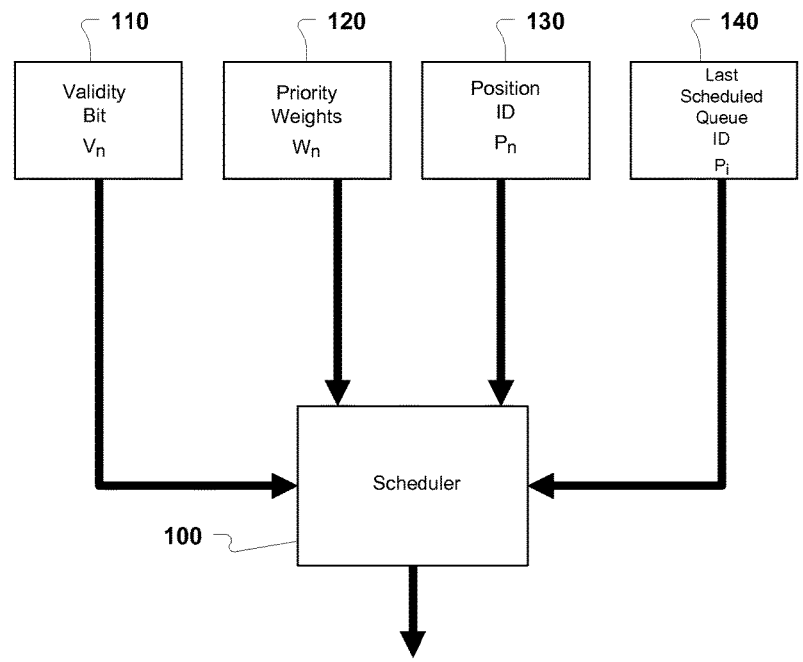
FIG. 1 illustrates the first stage of scheduler scheme for strict priority round robin scheduling with additional fairness factors, according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Data packets when received by a network switch or router are stored in a buffer prior to being forwarded to designated ports. During such data packet transmission congestion can occur when the designated data port is oversubscribed, rate limited or a downstream receiving device or addressed device is momentarily "not ready." In such instances, Qos schemes are necessary to maintain integrity or preferential service for high prioritized data traffic. Examples of high prioritized data traffic include control traffic for network control and voice or video traffic which is sensitive to latency delays. The process is explained in the following manner. Packets are sent from different source ports. The packets are then classified in multiple ways based on their source origination, port of origination, destination port to be sent, type of data packet, type of traffic etc . . . . Next, the data packets are sorted in multiple different queues (VOQ) in the buffers of the switches or router type devices. The static state of each queue is updated when a data packet is inputted into the queue. Based on the availability of a destination or output port, a data packet scheduler selects the right scheduling scheme to dequeue the data packets from a set of corresponding queues. The static of the queue is then updated when the data packet is outputted from the queue.

When combining the strict priority with the round robin data packets in the different queues will have different priority weights. For a given port, there are multiple priority queues being assigned. A scheduler will collect the weights for each assigned queue and then sort the weights out to find the maximum weight out of the sorted weights. Once, the scheduler has identified the maximum weight, the scheduler will pick the corresponding queue to the maximum weight identified as the next queue to be scheduled. This strict priority scheduling dependent on identifying the maximum weight does not identify other fairness factors for determining the next queue for scheduling.

Therefore, when there is no singular maximum weight, in other words a one or more maximum weights, since the maximum weight is the only metric used in strict priority scheduling, a bias to a particular queue may occur with the strict priority unless additional fairness factors are included. Therefore, it is necessary to add in additional to a weighted strict priority scheduling scheme additional factors so when there is a round robin scheduling and there are multiple maximum weights identified, a bias to a particular queue does not result.

Figure 2:
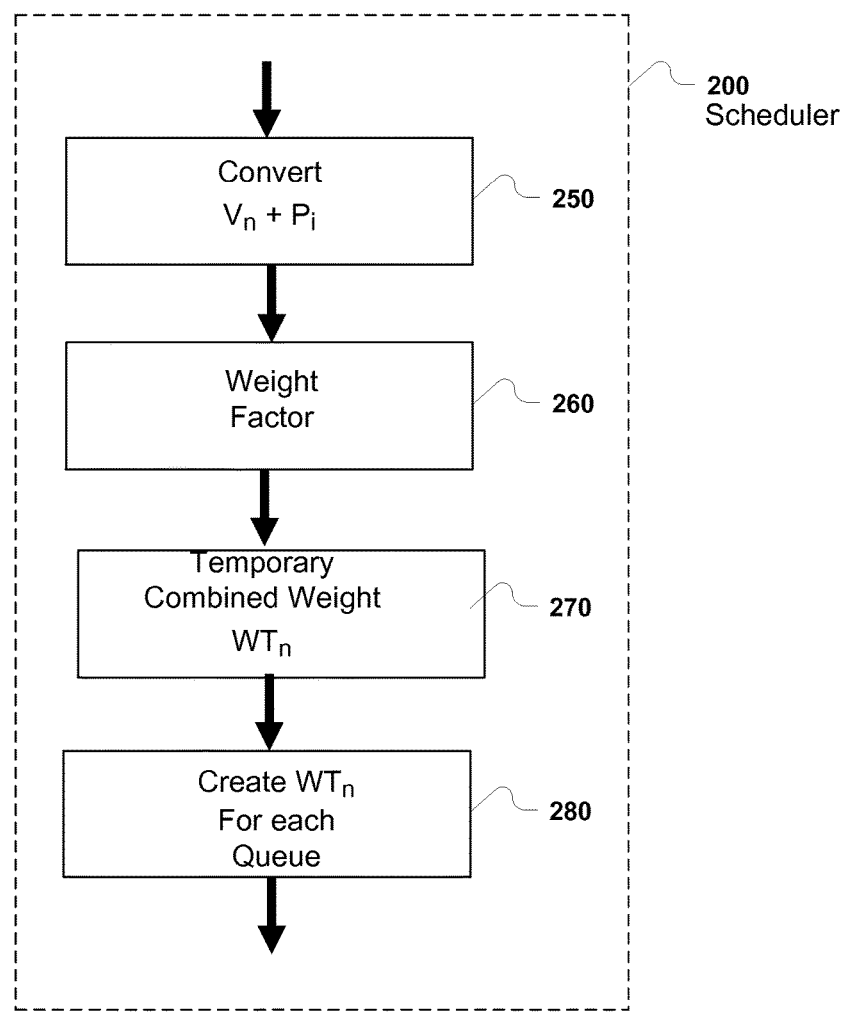
FIG. 2 illustrates the second stage of the scheduler scheme for strict priority round robin scheduling with additional fairness factors, according to embodiments of the present invention.
Figure 3:
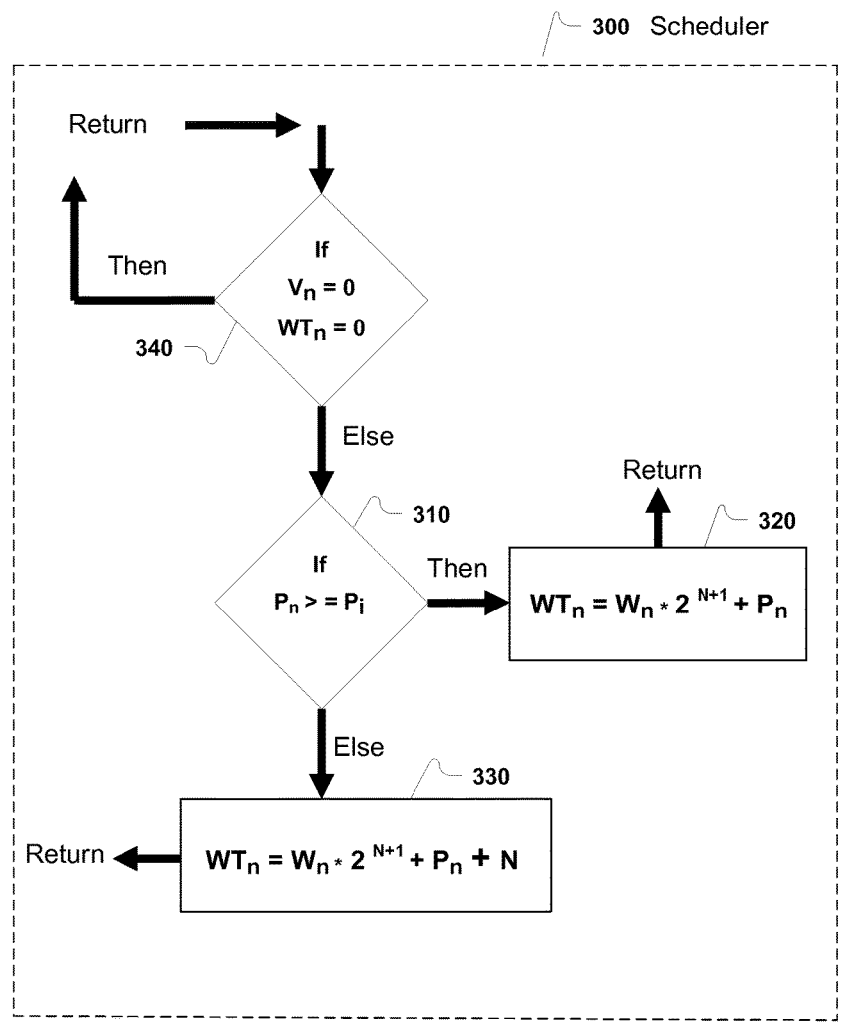
FIG. 3 illustrates the third stage of the scheduler scheme for strict priority round robin scheduling with additional fairness factors, according to embodiments of the present invention.

In FIGS. 1 to 3, illustrate the stages in which the following steps are implemented in the weighted round robin strict priority scheduling schedule with the additional fairness factors so that a non-bias selection of a request N is selected.

In FIG. 1, in the first stage, the scheduler will receive additional inputs, as follows:
(a) Validity bit for each queue $V_n$ to determine whether or not a queue is "empty" or "not empty".
(b) Priority Weights of each queue, $W_n$
(c) Position (or ID) of each queue, $P_n$
(d) Last scheduled queue ID, $P_i$ The additional inputs as shown in FIG. 1 are the Validity bit $V_n$ 110 to determine whether the selected queue is in an empty state or in a not empty state. A priority weight $W_n$ 120 from which the maximum weights for a queue is determined. The position ID $P_n$ 130 of the queue and the last scheduled queue ID $P_i$ 140. Hence, the scheduler receives four separate inputs. Theses inputs 110-140 allow the scheduler to form intermediate weights, find the maximum of the weights, and then determine priority and order.

Next in FIGS. 2 and 3, in the second and third stages, the validity $V_n$ and position id $P_n$ are converted into a combined weight factor in steps 250 and 260. Then this combined weight factor and priority weight $W_n * 2^{n+1} + P_n$ of step 270 is used to create a temporary combined weight $WT_n$ of step 280 for each queue. A pseudo-code below shows the process:

```
If (V==0){
    WT_n = 0;
}else {
```

```
If (Pₙ>=Pᵢ){
    WTn=Wₙ*2ⁿ⁺¹ + Pₙ;
}else {
    WTₙ=Wₙ*2ⁿ⁺¹ + Pₙ +n;
}
}
```

The combined result will increase the priority weights for the higher order bits of the combined weights and the position ID $P_n$ to the lower order bits of the combine weight $WT_n$. If the current queue ID is less than the last scheduled queue ID, an extra weight n can be added. This is called the round-robin weight. It will make the weight bias to a round robin rotating direction base on the last served position.

In FIG. 3 in the third stage 300 there is sorting the $WT_n$ to find the maximum weight. If $V_n=0$ and $WT_n=0$ in step 340, then the round robin determination is completed, else if $P_n>P_i$ in step 310 then the intermediate weight is created for the last request in step 320. The other equal prioritized requests are then also given intermediate weights in step 330. Since the priority weight is the higher order bits of the combined weight in the creating of the intermediate weight $WT_n$, the sorting results will reflect the priority weight first. If the priority weights are the same, the lower bits which the round-robin will be reflected by the $WT_n$ formula.

For example, if N requesters are accessing a common source and there are $N_n$ requests each making a request to a destination address. In such a case, one of the N requesters will be successful, while the others will not be successful.

$$N_i > N_j (i,j,\text{valid})$$

In addition, each of the N requesters has a certain priority, for example a request may have a priority "i" and another request may have a priority "j", if "i" is greater than "j" than priority request $N_i$ will be selected over request $N_j$. The higher the priority of the requester N the more likely the request will be prioritized over the other request.

$$N_i = N_j$$

When the priorities are both the same $N_i=N_j$, solutions may be biased and a request $N_i$ gets a preferential treatment so long as request $N_i$ gets priority. This is because request "i" is in consecutive priority or the adjacent next request. When the priorities "i" and "j" are the same, request $N_i$ will still be given priority or preferential treatment even though there is no distinguishing of priority as both priorities are equal, i=j. This is because of the consecutive ordering "i" is before "j" and the check each time is based only on priority with no additional factors.

Hence, even if you have a cyclical checking scheme (i.e. round robin), each time the strict priority is processed, request $N_i$ would still be given priority over request $N_j$. Hence, in a weighted strict priority round robin scheduling scheme which aim is to give equal weighting to the same requests based on weight and priority, even though priority is checked each round, the same result is returned. Request $N_i$ will always be selected as long it is valid as the check is based on the priority and the preferential treatment of s $N_i$ till exists. Only when $N_i$ is not valid then only will request $N_j$ be selected in general.

In the present invention to prevent this from occurring, the scheduler begins with checking the last request.

Last position=$P_l$

The last request $P_l$ is labeled as the start point or initial step. This is the last request $P_l$ which was prioritized in the previous round. This could be considered the node or request with the highest priority from the previous round. Hence, in the present invention, the strict priority scheduling scheme begins with the node that has been designated with the highest priority from the prior round. Next, the strict priority scheduling scheme if the request $P_l$ is in the middle, of the ordering of the requests, a temporary weight is generated. The order that is being followed is from the highest to the lowest order. In such instances, a temporary weight is created is based on the position $P_i$ and the priority weight $W_i$ and an offset $2^{(n+1)}$.

Temporary Weight=Temp_wt$_i$

As mentioned, the round robin process is cyclical, that is the process occurs again and again. The initial requester $P_0$ would have priority but at some point in the process, the $P_0$ would no longer exist and then a first requester would be selected by the scheduler. At this point, between the initial node, $P_0$ and the other nodes, a first requester would surpass the other requesters in round robin check. The priority weights for $P_i$ are shown in the table I for three nodes with the same Max weight below:

TABLE I

| |
|---|
| $W_0 = 7$ |
| $W_1 = 7$ |
| $W_2 = 7$ |

The scheduler creates a Temp_wt$_i$ which would have priority weight factored into it. In addition if there are multiple positions $P_i$ each having the same level of priority then the scheduler performs the analysis as follows:

Last position=$P_l$

A comparison is performed of the last position $P_l$ and the other positions $P_i$ in the same cyclical round.

If $P_i >= P_l$

Then a temporary weight Temp_Wt$_i$ is created as follows:

Temp_WT$_i$=$P_i$+$W_i$*$2^{n+1}$

Where $2^{n+1}$ is an offset for giving more weightage to priority weights $W_i$. Alternatively, If $P_i < P_l$ Then the following formula is used:

Temp_WT$_i$=$P_i$+$W_i$*$2^{n+1}$+N

Here again the created Temp_Wti has the priority weight $W_i$, maximizes the $W_i$ by an offset but in addition add the direction N so the scheduler proceeds from the highest to the lowest $P_i$ direction. In other words, the order is being determined from the highest to the lowest. However, if the request is greater value then the scheduler proceeds by adding the priority plus weight if request is lower than the scheduler adds the priority plus weight plus an additional number for ordering from higher to lower. With the additional +N the $P_0$ the zero requests will get an additional enhancement because of the N. Hence, a tiered approach is followed in forming the temporary weights $W_i$, by adding in the priority and ordering data.

The temporary weight uses the priority, and the order to grant is from highest to lowest. The request is based on priority which is based on an offset based on the number of requesters, if the request is lowered then there is added the same amount plus a direction from high to low.

Each round robin round of the $W_0$, $W_1$ and $W_2$ could be presented as follows:

TABLE II

| FIRST ROUND | | |
|---|---|---|
| 2 | 1 | 0 ($P_i$) |
| 1 | 1 | 1 ($W_i$) |
| ($P_I$) | | |
| SECOND ROUND | | |
| 2 | 1 | 0 ($P_i$) |
| 1 | 1 | 1 ($W_i$) |
| | ($P_I$) | |
| THIRD ROUND | | |
| 2 | 1 | 1 ($P_i$) |
| 1 | 1 | 1 ($W_i$) |
| | | ($P_I$) |

If $P_I=0$ then in the first round as shown in Table II, $P_2$ would be selected request. With equal weighted requests, $P_I$ it is the last request that won the previous round $P_2$ would be selected. Without, the offset factor and the temporary weight the second and third rounds would also result in $P_2$ as the selected weighted priority request. However, if use the Temp_$WT_i=P_i+W_i*2^{n+1}$ for the first request $P_2$ the result is shown in Table III below with Temp_$WT_2>$Temp_$WT_1$ and Temp_$WT_0>$Temp_$WT_2$ therefore while in the first round $P_2$ is selected, the second round will enable $P_1$ or $P_0$ to be selected.

With $P_I=1$ and N=3 (for a set of 3) then the temporary weights would be as follows:

TABLE III (1) Temp_$WT_0 = W_0^{(7)} * 2^4 + 3$
(2) Temp_$WT_1 = W_1^{(7)} * 2^4$
(3) Temp_$WT_2 = W_2^{(7)} * 2^4$ First determination using the Temp_$WT_i=P_i+W_i*2^{n+1}$ would be for weights as shown in TABLE III, if the weights $W_i*2^{n+1}$ are the same $W_1=W_2=W_3$, then the next is the strict priority round robin, shown by the $P_i$, and finally the strict priority weighted round robin plus+N the directional factor. The net rounds 2 and 3 in Table II would be the same enabling the selecting of either the $W_1$ or $W_2$ requests.

Figure 4:
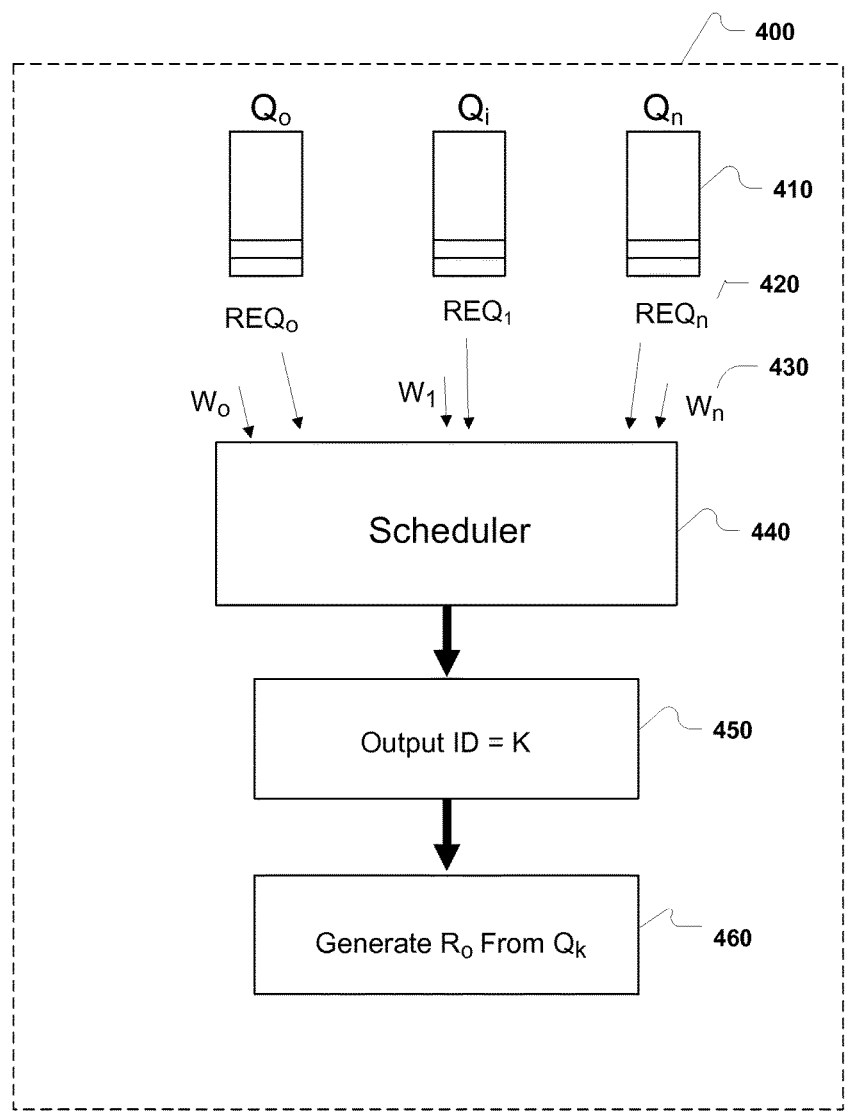
FIG. 4 illustrates a diagram of the scheduler system according to embodiments of the present invention.

In FIG. 4 there is shown a scheduler system 400 having a series of routers $Q_1$-$Q_n$ 410 sending requests $ReQ_0$-$ReQ_n$ 420 to a scheduler 440. Each of the requests $ReQ_0$-$ReQ_n$ 420 has a weight priority for inputting the necessary information for creating the round robin weight strict priority scheduling with the scheduler 440. The output Id 450 is sent from the scheduler 440 and the generated $R_0$ from the request ID $Q_k$ 460. The scheduler 440 creates the temporary weight Temp_Wti with the priority $P_i$ and adds an offset. Using the Temp_Wti, the scheduler creates an order from highest to lowest, if the request is greater than it add the priority plus, if request is lower than it adds priority plus weight plus an additional number from higher to lower. The last request, the zero requests gets a boost because of the N added. Once, the weights have been formed, the scheduler 440 finds the maximum of the weights, and then includes priority and order.

Embodiments of the present invention are thus described. While the present invention has been described in particular embodiments, it should be appreciated that the present invention should not be construed as limited by such embodiments, but rather construed according to the following claims.

What is claimed is:

1. A computer-implemented method using a scheduler for processing requests, the method comprising: receiving packet data from multiple source ports; classifying the packet data based upon the multiple source ports and destination ports associated therewith; sorting the packet data into multiple queues in a buffer; scheduling each of the multiple queues for transmission based on a temporary weight of each of the multiple queues that is calculated based on a set of fairness factors, wherein the set of fairness factors comprises: a validity bit of a respective queue, priority weight of the respective queue, a first position identification indicative of a position of the respective queue, and a second position identification indicative of a position of a last scheduled queue with a highest priority from a prior round, the scheduling further comprising selecting from at least two queues with a same maximum priority weight, and wherein an additional amount is added to the temporary weight of the respective queue if the first position identification indicates a lower position than the second position identification, and wherein the additional amount is equal to a number of queues selected from the at least two queues with the same maximum priority weight; and updating a static state of the respective queue of the multiple queues responsive to a data packet being input to the respective queue or output from the respective queue; and sending the output packet data dequeued from the scheduler towards the destination.

2. The method of claim 1, further comprising:
assigning the packet data to the multiple queues based on priority weights of the multiple queues.

3. The method of claim 2, further comprising:
assigning, for a destination port, multiple priorities for the multiple queues to assigned ports.

4. The method of claim 3, wherein the priority weight of the respective queue is determined based on a strict priority scheduling process, and wherein the method further comprises:
assigning priority weights to one or more of the multiple queues for a selected destination port;
collecting the priority weights of the one or more multiple queues; and
choosing a corresponding queue with a maximum priority weight as a next queue for scheduling.

5. The method of claim 4, wherein the scheduling further comprises:
adding round-robin weights upon multiple maximum weights associated with the multiple queues.

6. The method of claim 5 wherein the validity bit of the respective queue indicates emptiness of the respective queue.

7. The method of claim 6, wherein the scheduling further comprises, for the respective queue:
converting the validity bit and the first position identification of the respective queue into a weighting factor of the respective queue; and
combining the weighting factor with the priority weight of the respective queue into a temporary combined weight of the respective queue.

8. The method of claim 7, wherein the scheduling further comprises:
determining a higher order bit of the temporary combined weight based on the priority weight of the respective queue; and
determining a lower order bit of the temporary combined weight based on the first position identification of the respective queue.

9. The method of claim 8, wherein the additional amount is a round-robin weight.

10. The method of claim 9, wherein the round-robin weight enables a weight bias towards a round-robin direction at the last scheduled queue position identification.

11. The method of claim 1, wherein the classification of the packet data further comprises classifying the packet data based upon source origination of packet data, type of packet data, and type of traffic.

12. A tangible non-transitory computer-readable storage medium, comprising instructions that, when executed by a processor, perform a method for scheduling data routing requests, the method comprising: receiving packet data from multiple source ports; classifying the packet data based upon the multiple source ports and destination ports associated therewith; sorting the packet data into multiple queues in a buffer; scheduling each of the multiple queues for transmission based on a temporary weight of each of the multiple queues that is calculated based on a set of fairness factors, wherein the set of fairness factors comprises: a validity bit of a respective queue, priority weight of the respective queue, a first position identification indicative of a position of the respective queue, and a second position identification indicative of a position of a last scheduled queue with a highest priority from a prior round, the scheduling further comprising selecting from at least two queues with a same maximum priority weight, and wherein an additional amount is added to the temporary weight of the respective queue if the first position identification indicates a lower position than the second position identification, and wherein the additional amount is equal to a number of queues selected from the at least two queues with the same maximum priority weight; and updating a static state of the respective queue of the multiple queues responsive to a data packet being input to the respective queue or output from the respective queue; and sending the output packet data dequeued from the scheduler towards the destination.

13. The tangible non-transitory computer-readable storage medium of claim 12, further comprising:
assigning the packet data to the multiple queues based on priority weights associated with the multiple queues.

14. The tangible non-transitory computer-readable storage medium of claim 13, wherein the method further comprises:
assigning, for a destination port, multiple priorities for the multiple queues to assigned ports.

15. The tangible non-transitory computer-readable storage medium of claim 14, wherein the priority weight of the respective queue is determined based on a strict priority scheduling process, and wherein the method further comprises:
assigning priority weights to one or more of the multiple queues for a selected destination port;
collecting the priority weights of the one or more multiple queues; and
choosing a corresponding queue with a maximum priority weight as a next queue for scheduling.

16. The tangible non-transitory computer-readable storage medium of claim 15, wherein the scheduling further comprises:
adding round-robin weights upon multiple maximum weights associated with the multiple queues.

17. The tangible non-transitory computer-readable storage medium of claim 16, wherein the validity bit of the respective queue indicates emptiness of the respective queue.

18. The tangible non-transitory computer-readable storage medium of claim 17, wherein the scheduling further comprises, for the respective queue:
converting the validity bit and the first position identification of the respective queue into a weighting factor of the respective queue; and
combining the weighting factor with the priority weight of the respective queue into a temporary combined weight of the respective queue.

19. The tangible non-transitory computer-readable storage medium of claim 18, wherein the scheduling further comprises:
determining a higher order bit of the temporary combined weight based on the priority weight of the respective queue; and
determining a lower order bit of the temporary combined weight based on the first position identification of the respective queue.

20. The tangible non-transitory computer-readable storage medium of claim 19, wherein the additional amount is a round-robin weight.

21. The tangible non-transitory computer-readable storage medium of claim 20, wherein the round-robin weight enables a weight bias towards a round-robin direction at the last scheduled queue position identification.

22. A system comprising: at least one processor; and at least one tangible non-transitory computer-readable storage medium storing instructions that, when executed by the at least one processor, cause the system to perform a method for using a scheduler for processing requests, the method comprising: receiving packet data from multiple source ports; classifying the packet data based upon the multiple source ports and destination ports associated therewith; sorting the packet data into multiple queues in a buffer; scheduling each of the multiple queues for transmission based on a temporary weight of each of the multiple queues that is calculated based on a set of fairness factors, wherein the set of fairness factors comprises: a validity bit of a respective queue, priority weight of the respective queue, a first position identification indicative of a position of the respective queue, and a second position identification indicative of a position of a last scheduled queue with a highest priority from a prior round, the scheduling further comprising selecting from at least two queues with a same maximum priority weight, and wherein the temporary weight of the respective queue is incremented by an additional amount if the first position identification indicates a lower position than the second position identification, and wherein the additional amount is equal to a number of queues selected from the at least two queues with the same maximum priority weight; and updating a static state of the respective queue of the multiple queues responsive to a data packet being input to the respective queue or output from the respective queue; and sending the output packet data dequeued from the scheduler towards the destination.

23. The system of claim 22, wherein the method further comprises:
assigning the packet data to the multiple queues based on priority weights associated with the multiple queues.

24. The system of claim 23, wherein the method further comprises:
assigning, for a destination port, multiple priorities for the multiple queues to assigned ports.

25. The system of claim 24, wherein the priority weight of the respective queue is determined based on a strict priority scheduling process, and wherein the method further comprises:

assigning priority weights to one or more of the multiple queues for a selected destination port;

collecting the priority weights of the one or more multiple queues; and choosing a corresponding queue with a maximum priority weight as a next queue for scheduling.

26. The system of claim 25, wherein the scheduling further comprises:

adding round-robin weights upon multiple maximum weights associated with the multiple queues.

27. The system of claim 26, wherein the validity bit of the respective queue indicates emptiness of the respective queue.

28. The system of claim 25, wherein the scheduling further comprises, for the respective queue:

converting the validity bit and the first position identification of the respective queue into a weighting factor of the respective queue; and combining the weighting factor with the priority weight of the respective queue into a temporary combined weight of the respective queue.

29. The system of claim 28, wherein the scheduling further comprises:

determining a higher order bit of the temporary combined weight based on the priority weight of the respective queue; and determining a lower order bit of the temporary combined weight based on the first position identification of the respective queue.

30. The system of claim 29, wherein the additional amount is a round-robin weight.

31. The system of claim 30, wherein the round-robin weight enables a weight bias towards a round-robin direction at the last scheduled queue position identification.

* * * * *